(12) United States Patent
Zhu

(10) Patent No.: US 11,895,659 B2
(45) Date of Patent: Feb. 6, 2024

(54) CONTROL INSTRUCTION TRANSMISSION METHOD, BASE STATION, TERMINAL AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 439 days.

(21) Appl. No.: 17/280,139

(22) PCT Filed: Sep. 28, 2018

(86) PCT No.: PCT/CN2018/108455
§ 371 (c)(1),
(2) Date: Mar. 25, 2021

(87) PCT Pub. No.: WO2020/062083
PCT Pub. Date: Apr. 2, 2020

(65) Prior Publication Data
US 2022/0007355 A1  Jan. 6, 2022

(51) Int. Cl.
*H04W 72/21* (2023.01)
*H04W 72/51* (2023.01)
*H04W 72/0453* (2023.01)

(52) U.S. Cl.
CPC ........... *H04W 72/21* (2023.01); *H04W 72/51* (2023.01); *H04W 72/0453* (2013.01)

(58) Field of Classification Search
CPC . H04W 72/21; H04W 72/51; H04W 72/0453; H04W 74/0808; H04W 72/23;
(Continued)

(56) References Cited

U.S. PATENT DOCUMENTS 10,292,149 B2   5/2019  Wang et al.
11,284,477 B2 * 3/2022  Islam .................... H04W 76/11
(Continued)

FOREIGN PATENT DOCUMENTS

CN    105103637 A    11/2015
CN    105356967 A     2/2016
(Continued)

OTHER PUBLICATIONS

Xiaomi, "Discussion of DL signals for NR-U", 3GPP TSG RAN WG1 Meeting #94bis, R1-1811415, Chengdu, China, Oct. 8-12, 2018 (Year: 2018).*
(Continued)

*Primary Examiner* — Brian T O Connor
(74) *Attorney, Agent, or Firm* — Syncoda LLC; Feng Ma

(57) ABSTRACT

A control instruction transmission method includes: after unsuccessfully occupying a first frequency-domain resource, occupying a second frequency-domain resource, wherein the first and second frequency-domain resource are different unlicensed frequency-domain resources; and starting timing from a pre-set detection moment, and when the timing duration reaches a pre-set duration, sending a control instruction by means of the second frequency-domain resource. A base station can configure different unlicensed frequency-domain resources for a terminal. After occupying a first frequency-domain resource unsuccessfully, the base station occupies a second frequency-domain resource, and starts timing from a pre-set detection moment, and when the timing duration reaches a pre-set duration, sends a control instruction through the second frequency-domain resource, thereby ensuring that when unsuccessfully occupying a certain unlicensed frequency-domain resource, the base station can also send a control instruction through occupying another unlicensed frequency-domain resource.

12 Claims, 9 Drawing Sheets

(58) Field of Classification Search
CPC ...... H04W 76/19; H04W 16/14; H04L 5/001; H04L 5/0053; H04L 5/0098; H04L 27/0006
See application file for complete search history.

(56) References Cited

U.S. PATENT DOCUMENTS

| | | | |
|---|---|---|---|
| 11,388,747 B2* | 7/2022 | Tooher | H04W 72/0453 |
| 11,477,818 B2* | 10/2022 | Hooli | H04L 5/0078 |
| 2012/0320853 A1 | 12/2012 | Kwon | |
| 2016/0183263 A1 | 6/2016 | Liu | |
| 2017/0055251 A1 | 2/2017 | Zhang | |
| 2017/0142740 A1 | 5/2017 | Gou | |
| 2017/0311206 A1 | 10/2017 | Ryoo et al. | |
| 2017/0339696 A1 | 11/2017 | Xu | |
| 2018/0048431 A1 | 2/2018 | Wang et al. | |
| 2018/0124749 A1 | 5/2018 | Park | |
| 2018/0227838 A1 | 8/2018 | Hayashi et al. | |
| 2018/0255534 A1 | 9/2018 | Wang et al. | |
| 2020/0100170 A1* | 3/2020 | Babaei | H04W 74/0833 |
| 2021/0243807 A1* | 8/2021 | Hooli | H04L 47/76 |
| 2022/0264462 A1* | 8/2022 | Bao | H04W 52/0274 |
| 2022/0346139 A1* | 10/2022 | Tooher | H04W 72/0453 |

FOREIGN PATENT DOCUMENTS

| | | |
|---|---|---|
| CN | 105592478 A | 5/2016 |
| CN | 105991246 A | 10/2016 |
| CN | 106063347 A | 10/2016 |
| CN | 106535333 A | 3/2017 |
| CN | 107241288 A | 10/2017 |
| CN | 107948988 A | 4/2018 |
| CN | 108496390 A | 9/2018 |
| WO | 2016072495 A1 | 5/2016 |
| WO | 2017133445 A1 | 8/2017 |
| WO | 2017135726 A1 | 8/2017 |
| WO | 2018027997 A1 | 2/2018 |

OTHER PUBLICATIONS

Xiaomi:"Discussion on the PDCCH repetition for NR URLLC" 3GPP Draft; R1-1809291_Discussion On Thepdcch Repetition for NR URLLC, 3rd Generation Partnership Project (3GPP), Mobile Competence Centre 650, Route Desluciolesf-06921 Sophia-Antipolis Cedex000vol. RAN WG1, No. Gothenburg, Sweden; Aug. 20, 2018-Aug. 24, 2018 Aug. 11, 2018 (Aug. 11, 2018), XP051516655, Retrieved from the Internet: URL: http://www.3gpp.org/ftp/tsg%5Fran/WG1%5FRL1/TSGR1%5F94/Docs/R1%2D1809291%2Ezip[retrieved on].

Mediatek Inc:"Further Details on wider Bandwidth Operations in NR" 3GPP Draft; R1-1710796 Further Details Onwider Bandwidth Operations in NR, 3rdgeneration Partnership Project(3GPP) Mobile Competence Centre 650, Route Desluciolesf-06921 Sophia-Antipolis Ced0vol. RAN WG1no. Qingdao, P.R. China; Jun. 27, 2017-Jun. 30, 2017 Jun. 26, 2017(Jun. 26, 2017), XP051300000, Retrieved from the Internet: URL: http://www.3gpp.org/ftp/Meetings_3GPPSYNC/RAN1/Docs/[retrieved on Jun. 26, 2017]*paragraph[02.4].

Nokia et al:"On Wideband Operation for NR-U" 3GPP Draft; R1-1808825_NRU WB Operation, 3rd Generation Partnership Project(3GPP), Mobile Competence Centre: 650, Route Desluciolesf-06921 Sophia-Antipolis Cedex; France, vol. RANWGI, no. Gothenburg, Sweden; Aug. 20, 2018-Aug. 24, 2018 Aug. 10, 2018 (Aug. 10, 2018), XP051516198, Retrieved from the Internet: URL: http://www.3gpp.org/ftp/tsg%5Fran/WG1%5FRL1/TSGR1%5F94/Docs/R1%2D1808825%2Ezip[retrieved on Aug. 10, 2018].

Interdigital Inc: "BWP operation in unlicensed spectrum", 3GPP Draft; R1-1806968 (R15 NR WI AI 7645BWP for NR-U), 3rd Generationpartnership Project (3GPP), Mobilecompetence Centre ; 650, Route Desluciioles ; F-06921 Sophia-Antipolis Cedex France vol. RAN WG1, no. Busan, Korea; 201805212018052520 May 2018 (May 20, 2018) , XP051442167, Retrieved from the Internet: URL:http://www.3gpp.org/ftp/Meetings%5F3GPP%5FSYNC/RAN1/Docs/[retrieved on May 20, 2018]* paragraph [02.1] *.

Supplementary European Search Report in the European application No. 18935022.6, dated Apr. 20, 2022.

Office Action of the Indian application No. 202147018395, dated Feb. 16, 2022.

Sony, "High Level Views on NR-U BWP", 3GPP TSG RAN WG1 Meeting 91 R1-1720475, Dec. 2, 2017 (Dec. 2, 2017).

Samsung, "Frame structure for NR-U", 3GPP TSG RAN WG1 Meeting #94 R1-1808765, Aug. 24, 2018 (Aug. 24, 2018).

International Search Report in the international application No. PCT/CN2018/108455, dated Jun. 27, 2019.

Written Opinion of the International Search Authority in the international application No. PCT/CN2018/108455, dated Jun. 27, 2019.

First Office Action of the Chinese application No. 201880001532.3, dated Oct. 9, 2022.

Huang Xiaoge, LI Yangyang, Liu Sijia, Chen Qianbin, Coexistence mechanism of LTE-U and WiFi systems in the unlicensed spectrum, Journal of Chongging University of Posts and Telecommunications (Natural Science Edition), vol. 29 No. 5, Oct. 2017. the whole document. 8 pages with English abstract.

3GPP TS 36.133 V13.7.0 (Mar. 2017), 3rd Generation Partnership Project; Technical Specification Group Radio Access Network; Evolved Universal Terrestrial Radio Access (E-UTRA); Requirements for support of radio resource management (Release 13). the whole document. 62 pages.

3GPP TSG RAN meeting #81 RP-181704, Gold Coast, Australia, Sep. 10-13, 2018, WI/SI Name: Study on NR-based Access to Unlicensed Spectrum, Source: Qualcomm. the whole document. 8 pages.

NTT Docomo, Inc. "New Radio (NR) Access Technology", 3GPP TSG RAN meeting #76 RP-1711505 West Palm Beach, USA, Jun. 5-8, 2017, the whole document. 218 pages.

* cited by examiner

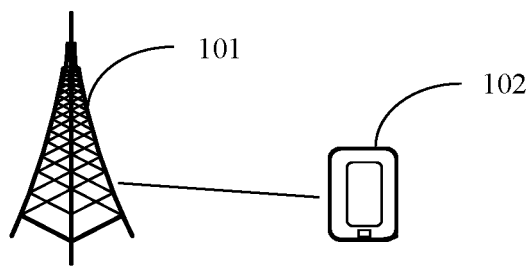

FIG. 1

```
┌─────────────────────────────────────────────────────────┐  201
│ After an occupancy of a first frequency domain resource │ /
│    fails, a second frequency domain resource is occupied│
└─────────────────────────────────────────────────────────┘
                            │
                            ▼
┌─────────────────────────────────────────────────────────┐  202
│  Timing is started from a preset detection time point,  │ /
│   and responsive to that a timing duration for which    │
│  the timing lasts reaches a preset duration, the control│
│   command is sent through the second frequency domain   │
│                        resource                         │
└─────────────────────────────────────────────────────────┘
```

FIG. 2

CONTROL INSTRUCTION TRANSMISSION METHOD, BASE STATION, TERMINAL AND STORAGE MEDIUM

CROSS-REFERENCE TO RELATED APPLICATION

This application is a U.S. national stage of International Application No. PCT/CN2018/108455 filed on Sep. 28, 2018, the disclosure of which is hereby incorporated by reference in its entirety.

TECHNICAL FIELD

The disclosure relates to the technical field of communications, and in particular, to a method for transmitting a control command, a base station, a terminal and a storage medium.

BACKGROUND

In wireless communication systems, licensed frequency domain resources are generally used for transmission. However, with the continuous development of new generation of Internet applications, higher requirements are imposed on the wireless communication technology, which drives the continued evolution of wireless communication technology. The licensed frequency domain resources cannot fulfill the demands of transmission. Accordingly, a listen before talk mechanism has been proposed to implement the function of using unlicensed frequency domain resources. The unlicensed frequency domain resources may be used for transmission between the base station and the terminal, such as transmission of a control command.

In the related art, when a control command is to be sent from a base station to a terminal through an unlicensed frequency domain resource, the base station firstly configures the terminal with a preset detection time point for the control command to be transmitted on the unlicensed frequency domain resource. Thereafter, the base station detects the state of the unlicensed frequency domain resource, and the base station is able to successfully occupy the unlicensed frequency domain resource when the unlicensed frequency domain resource is in an idle state. Then the base station sends the control command to the terminal through the unlicensed frequency domain resource at the preset detection time point, and the terminal detects the control command through the unlicensed frequency domain resource at the preset detection time point.

SUMMARY

The disclosure provides a method for transmitting a control command, a base station, a terminal and a storage medium, to solve the problem of the related arts. The technical solution is described as follows.

According to a first aspect of an embodiment of the disclosure, there is provided a method for transmitting a control command, applied to a base station, the method including:

after an occupancy of a first frequency domain resource fails, a second frequency domain resource is occupied, the first frequency domain resource and the second frequency domain resource are different unlicensed frequency domain resources; and timing is started from a preset detection time point, and responsive to that a timing duration for which the timing lasts reaches a preset duration, the control command is sent through the second frequency domain resource.

In a possible implementation, the method may further include:

capability of switching between frequency domain resources is received from a terminal; and a duration used by the terminal for switching between the frequency domain resources is determined as the preset duration according to the capability of switching between the frequency domain resources.

In a possible implementation, the preset duration is a duration used by the terminal for switching from the first frequency domain resource to the second frequency domain resource.

According to a second aspect of an embodiment of the disclosure, there is provided a method for transmitting a control command, applied to a base station, the method including:

after an occupancy of a first frequency domain resource fails, a second frequency domain resource is occupied, the first frequency domain resource and the second frequency domain resource are different unlicensed frequency domain resources; and the control command is sent through the second frequency domain resource at a preset detection time point, the control command includes first command data and second command data, and the second command data is identical to command data of the first command data that is transmitted within a preset duration starting from the preset detection time point.

In a possible implementation, the method may further include:

capability of switching between frequency domain resources is received from a terminal; and a duration used by the terminal for switching between the frequency domain resources is determined as the preset duration according to the capability of switching between the frequency domain resources.

In a possible implementation, the preset duration is a duration used by the terminal for switching from the first frequency domain resource to the second frequency domain resource.

According to a third aspect of an embodiment of the disclosure, there is provided a method for transmitting a control command, applied to a terminal, the method including:

responsive to failing to detect, at a preset detection time point, a control command sent by a base station through a first frequency domain resource, the terminal switches from the first frequency domain resource to a second frequency domain resource, herein the first frequency domain resource and the second frequency domain resource are different unlicensed frequency domain resources;

a control command sent by the base station through the second frequency domain resource is detected to obtain third command data and second command data; and first command data is acquired by arranging the second command data in front of the third command data, the second command data is identical to command data of the first command data that is transmitted within a preset duration starting from the preset detection time point, and the third command data is identical to command data of the first command data that is transmitted after the preset duration starting from the preset detection time point.

In a possible implementation, the method may further include:

capability of switching between frequency domain resources of the terminal is determined; and the capability of switching between the frequency domain resources is sent to the base station, the capability of switching between the frequency domain resources is used for determining the preset duration.

In a possible implementation, the preset duration is a duration used by the terminal for switching from the first frequency domain resource to the second frequency domain resource.

According to a fourth aspect of an embodiment of the disclosure, there is provided a base station, and the base station includes an occupancy module and a sending module.

The occupancy module is configured to: after an occupancy of a first frequency domain resource fails, occupy a second frequency domain resource, the first frequency domain resource and the second frequency domain resource are different unlicensed frequency domain resources.

The sending module is configured to start timing from the preset detection time point, and responsive to that a timing duration for which the timing lasts reaches a preset duration, send the control command through the second frequency domain resource.

In a possible implementation, the base station may further include a receiving module and a determination module.

The receiving module is configured to receive capability of switching between frequency domain resources from a terminal.

The determination module is configured to determine, according to the capability of switching between the frequency domain resources, a duration used by the terminal for switching between the frequency domain resources as the preset duration.

In a possible implementation, the preset duration is a duration used by the terminal for switching from the first frequency domain resource to the second frequency domain resource.

According to a fifth aspect of an embodiment of the disclosure, there is provided a base station, and the base station includes an occupancy module and a sending module.

The occupancy module is configured to: after an occupancy of a first frequency domain resource fails, occupy a second frequency domain resource, the first frequency domain resource and the second frequency domain resource are different unlicensed frequency domain resources.

The sending module is configured to send the control command through the second frequency domain resource at a preset detection time point.

The control command includes first command data and second command data, and the second command data is identical to command data of the first command data that is transmitted within a preset duration starting from the preset detection time point.

In a possible implementation, the base station may further include a receiving module and a determination module.

The receiving module is configured to receive capability of switching between frequency domain resources from a terminal.

The determination module is configured to determine, according to the capability of switching between the frequency domain resources, a duration used by the terminal for switching between the frequency domain resources as the preset duration.

In a possible implementation, the preset duration is a duration used by the terminal for switching from the first frequency domain resource to the second frequency domain resource.

According to a sixth aspect of an embodiment of the disclosure, there is provided a terminal, and the terminal includes a switching module, a detection module and an arrangement module.

The switching module is configured to: responsive to failing to detect, at a preset detection time point, a control command sent by a base station through a first frequency domain resource, switch from the first frequency domain resource to a second frequency domain resource, herein the first frequency domain resource and the second frequency domain resource are different unlicensed frequency domain resources.

The detection module is configured to detect a control command sent by the base station through the second frequency domain resource to obtain third command data and second command data.

The arrangement module is configured to acquire first command data by arranging the second command data in front of the third command data.

The second command data is identical to command data of the first command data that is transmitted within a preset duration starting from the preset detection time point, and the third command data is identical to command data of the first command data that is transmitted after the preset duration starting from the preset detection time point.

In a possible implementation, the terminal may further include a determination module and a sending module.

The determination module is configured to determine capability of switching between frequency domain resources of the terminal.

The sending module is configured to send the capability of switching between the frequency domain resources to the base station, the capability of switching between the frequency domain resources is used for determining the preset duration.

In a possible implementation, the preset duration is a duration used by the terminal for switching from the first frequency domain resource to the second frequency domain resource.

According to a seventh aspect of an embodiment of the disclosure, there is provided a base station, including:

a processor; and a memory configured to store instructions executable by the processor, herein the processor is configured to:

after an occupancy of a first frequency domain resource fails, occupy a second frequency domain resource, the first frequency domain resource and the second frequency domain resource are different unlicensed frequency domain resources; and start timing from the preset detection time point, and responsive to that a timing duration for which the timing lasts reaches a preset duration, send the control command through the second frequency domain resource.

According to an eighth aspect of an embodiment of the disclosure, there is provided a base station, including:

a processor; and a memory configured to store instructions executable by the processor, herein the processor is configured to:

after an occupancy of a first frequency domain resource fails, occupy a second frequency domain resource, the first frequency domain resource and the second frequency domain resource are different unlicensed frequency domain resources; and send the control command through the second frequency domain resource at a preset detection time point, the control command includes first command data and second command data, and the second command data is identical to command data of the first command data that is transmitted within a preset duration starting from the preset detection time point.

According to a ninth aspect of an embodiment of the disclosure, there is provided a terminal, including a processor; and a memory configured to store instructions executable by the processor, and the processor is configured to:

a processor; and a memory configured to store instructions executable by the processor, herein the processor is configured to:

responsive to failing to detect, at a preset detection time point, a control command sent by a base station through a first frequency domain resource, switch from the first frequency domain resource to a second frequency domain resource, the first frequency domain resource and the second frequency domain resource are different unlicensed frequency domain resources;

detect a control command sent by the base station through the second frequency domain resource to obtain third command data and second command data; and acquire first command data by arranging the second command data in front of the third command data, the second command data is identical to command data of the first command data that is transmitted within a preset duration starting from the preset detection time point, and the third command data is identical to command data of the first command data that is transmitted after the preset duration starting from the preset detection time point.

According to a tenth aspect of an embodiment of the disclosure, there is provided a computer-readable storage medium having stored thereon at least one instruction stored. The at least one instruction is loaded and executed by a processor to implement operations of the method for transmitting a control command according to the first aspect.

According to an eleventh aspect of an embodiment of the disclosure, a computer-readable storage medium having at least one instruction stored thereon. The at least one instruction is loaded and executed by a processor to implement operations of the method for transmitting a control command according to the second aspect.

According to a twelfth aspect of an embodiment of the disclosure, a computer-readable storage medium having at least one instruction stored thereon. The at least one instruction is loaded and executed by a processor to implement operations of the method for transmitting a control command according to the third aspect.

A method for transmitting a control command, a base station, a terminal and a storage medium are provided in embodiments of the disclosure. The base station configures different unlicensed frequency domain resources for the terminal, and after an occupancy of a first frequency domain resource fails, the base station occupies a second frequency domain resource and starts timing from a preset detection time point; and responsive to that a timing duration for which the timing lasts reaches a preset duration, the control command is sent through the second frequency domain resource. Therefore, it is ensured that that the base station is able to send a control command by occupying another unlicensed frequency domain resource when the occupancy of a certain frequency domain resource fails, and it is possible to avoid the problem that the base station may not able to send a control command due to the failure of occupying an unlicensed frequency domain resource. Moreover, the preset duration required by the terminal to switch between frequency domain resources is considered, and the time point at which the control command is started to be sent is postponed by the preset duration. Therefore, it is ensured that when the terminal detects the control command after switching between the frequency domain resources, the time point at which the control command is detected is coincident with the time point at which the base station sends the control command, such that the terminal is able to detect complete command data and a loss of the command data is avoided.

A method for transmitting a control command, a base station, a terminal and a storage medium are provided in embodiments of the disclosure. The base station configures different unlicensed frequency domain resources for the terminal, and after an occupancy of a first frequency domain resource fails, the base station occupies a second frequency domain resource and sends the control command through the second frequency domain resource at a preset detection time point, the control command includes first command data and second command data. Therefore, it is ensured that that the base station is able to send a control command by occupying another unlicensed frequency domain resource when the occupancy of a certain frequency domain resource fails, and it is possible to avoid the problem that the base station may not be able to send a control command due to the failure of occupying an unlicensed frequency domain resource. Moreover, taking into consideration the fact that the terminal will take the preset duration to switch between frequency domain resources, and the terminal can detect only the third command data in the first command data but cannot detect the second command data transmitted before the third command data, thus the second command data is repeatedly transmitted. In this way, it is ensured that the terminal is able to detect the third command data and the second command data and arrange the second command data in front of the third command data, such that the complete first command data is obtained and a loss of the command data is avoided.

BRIEF DESCRIPTION OF THE DRAWINGS

The accompanying drawings, which are incorporated in and constitute a part of this specification, illustrate embodiments of the disclosure and, together with the description, serve to explain the principles of the disclosure.

FIG. 1 is a schematic structural diagram illustrating a communication system according to an exemplary embodiment.

FIG. 2 is a flowchart of a method for transmitting a control command according to an exemplary embodiment.

DETAILED DESCRIPTION

Figure 3:
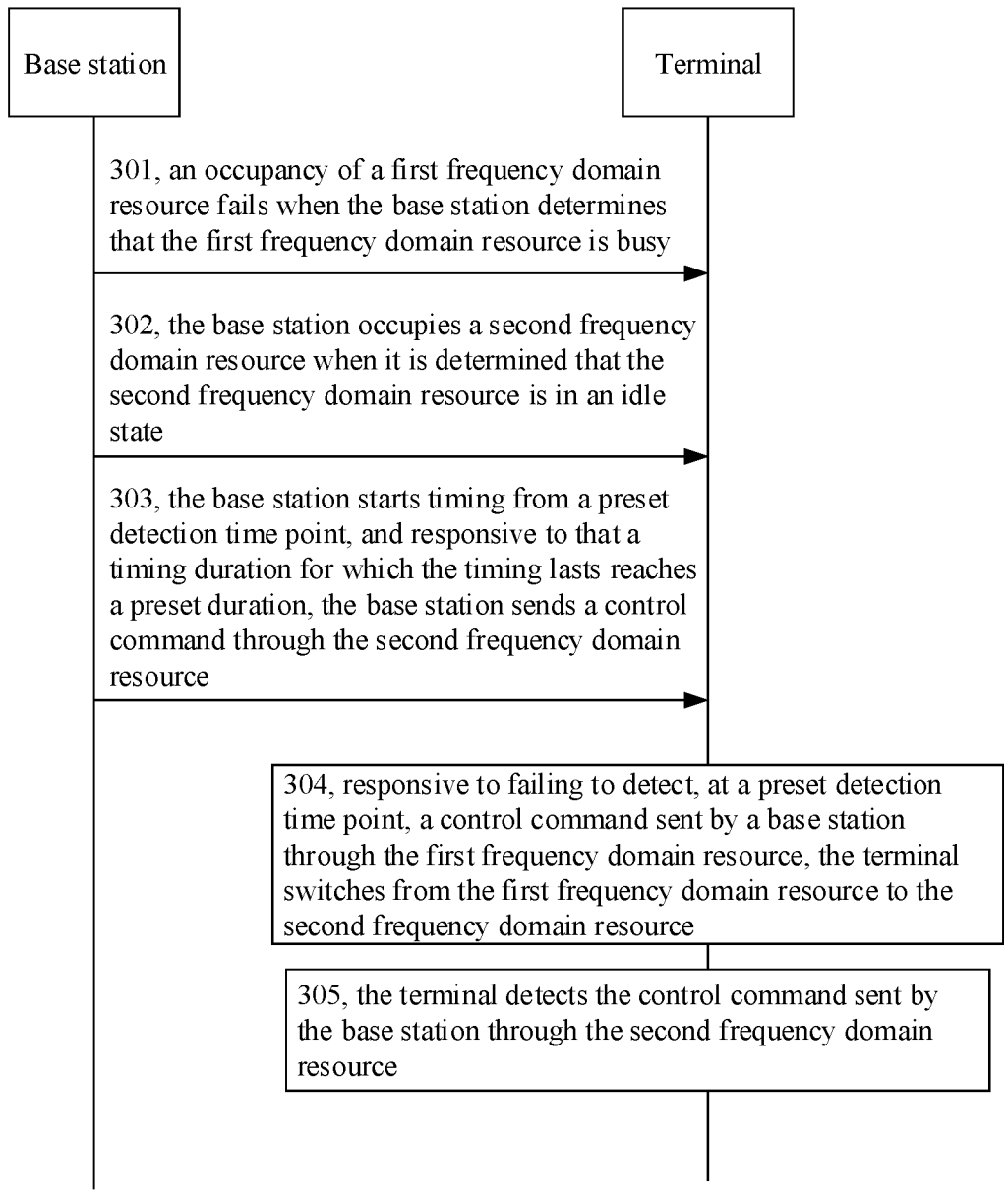
FIG. 3 is a flowchart of a method for transmitting a control command according to an exemplary embodiment.

In order to make the purpose, technical solutions and advantages of the disclosure more clear and obvious, the disclosure will be further illustrated in detail in combination with implementations and accompanying drawings hereinafter. The exemplary embodiments of the disclosure herein are used to explain the disclosure but do not limit the disclosure.

Embodiments of the disclosure provide a method for transmitting a control command, a base station, a terminal and a storage medium. The disclosure will be illustrated in detail in combination with the accompanying drawings hereinafter.

FIG. 1 is a schematic structural diagram illustrating a communication system according to an exemplary embodiment. As illustrated in FIG. 1, the communication system includes a base station 101 and a terminal 102, the base station 101 and the terminal 102 are connected through a communication network.

During a communication process, the base station 101 may send a control command to the terminal, and the control command is detected by the terminal 102, thereby control of the terminal 102 by the base station 101 is realized.

If the current unlicensed frequency domain resource is occupied when a control command is to be sent from the base station 101 to the terminal 102 through the unlicensed frequency domain resource, the base station may send the control command through another unlicensed frequency domain resource, and the terminal 102 switches from the current unlicensed frequency domain resource to another unlicensed frequency domain resource and detects the control command sent by the base station on another unlicensed frequency domain resource.

FIG. 2 is a flowchart of a method for transmitting a control command according to an exemplary embodiment, applied to a base station. As illustrated in FIG. 2, the method includes the following operations.

At operation 201, after an occupancy of a first frequency domain resource fails, a second frequency domain resource is occupied, herein the first frequency domain resource and the second frequency domain resource are different unlicensed frequency domain resources.

At operation 202, timing is started from a preset detection time point, and responsive to that a timing duration for which the timing lasts reaches a preset duration, the control command is sent through the second frequency domain resource.

In a possible implementation, the base station and the terminal may negotiate in advance to determine the preset duration. For example, the base station may send the preset duration to the terminal through higher layer signaling, MAC CE (Media Access Control Control Element) signaling, and physical layer signaling or other signaling; or, the preset duration may be preset in a transmission protocol instead of being sent by the base station through signaling.

According to the method in an embodiment of the disclosure, the base station configures different unlicensed frequency domain resources for the terminal, and after an occupancy of a first frequency domain resource fails, the base station occupies a second frequency domain resource and starts timing from a preset detection time point, and responsive to that a timing duration for which the timing lasts reaches a preset duration, sends a control command through the second frequency domain resource. Therefore, it is ensured that that the base station sends the control command by occupying another unlicensed frequency domain resource when the occupancy of a certain frequency domain resource fails, and it is possible to avoid the problem that the base station cannot send a control command due to the failure of occupying the unlicensed frequency domain resource.

Moreover, the preset duration required by the terminal to switch between frequency domain resources is considered, and the time point at which the control command is started to be sent is postponed by the preset duration. Therefore, it is ensured that when the terminal detects the control command after switching between the frequency domain resources, the time point at which the control command is detected is coincident with the time point at which the base station sends the control command, such that the terminal is able to detect complete command data and a loss of the command data is avoided.

In a possible implementation, the method further includes that:

capability of switching between frequency domain resources is received from a terminal, and a duration used by the terminal for switching between the frequency domain resources is determined as the preset duration according to the capability of switching between the frequency domain resources.

In a possible implementation, the preset duration is a duration used by the terminal for switching from the first frequency domain resource to the second frequency domain resource.

FIG. 3 is a flowchart of a method for transmitting a control command according to an exemplary embodiment. The interaction subjects in the embodiment are the base station and the terminal in the embodiment illustrated in FIG. 1. As illustrated in FIG. 3, the method includes the following operations.

At operation 301, an occupancy of a first frequency domain resource fails when the base station determines that the first frequency domain resource is busy.

The base station pre-configures a plurality of different unlicensed frequency domain resources for the terminal. The unlicensed frequency domain resource may be a bandwidth part that is one or more consecutive segments of resources in the frequency domain. For example, the base station may configure a plurality of carriers for the terminal, and each carrier includes a plurality of bandwidth parts. Moreover, the bandwidth of each bandwidth part may be 10 MHz (megahertz), 20 MHz, etc. The bandwidths of different bandwidth parts may be equal or unequal.

In a communication process, the terminal firstly operates on a certain frequency domain resource among a plurality of unlicensed frequency domain resources. When a control command is to be sent from the base station to the terminal, the state of the frequency domain resource may be detected firstly.

If the frequency domain resource is not occupied by any other system yet and is in an idle state currently, the base station may occupy the frequency domain resource and send the control command through the frequency domain resource. Correspondingly, the terminal may detect the control command sent by the base station through the frequency domain resource.

If the frequency domain resource is occupied by any other system and is busy currently, an occupancy of the frequency domain resource by the base station fails. In this case, the base station may detect the state of another frequency domain resource so that the control command is sent through said another frequency domain resource. Correspondingly, the terminal may detect the control command sent by the base station through a frequency domain resource on which the terminal currently operates. If the detection of the control command fails, the terminal may switch to another frequency domain resource and detect the control command sent through another frequency domain resource Other systems therein may include other base stations in the communication system where the above base station is located, and may also include other communication systems than the communication system where the base station is located, such as a WiFi (Wireless Fidelity) system and so on.

In the embodiments of the disclosure, description is made by taking, as an example, a case where the terminal firstly operates at a first frequency domain resource and then switches to a second frequency domain resource, the first frequency domain resource and the second frequency domain resource are different unlicensed frequency domain resources. If the first frequency domain resource is pre-occupied by another system when the control command is to be sent from the base station to the terminal through the first frequency domain resource, the base station may detect that the first frequency domain resource is busy, as a result, the occupancy of the first frequency domain resource by the base station fails. In this case, the base station may detect the state of another unlicensed frequency domain resource to occupy said another unlicensed frequency domain resource.

At operation 302, the base station occupies a second frequency domain resource when it is determined that the second frequency domain resource is in an idle state.

The first frequency domain resource and the second frequency domain resource are different unlicensed frequency domain resources.

The base station may detect the state of the second frequency domain resource, and occupy the second frequency domain resource when it is determined that the second frequency domain resource is in an idle state.

At operation 303, the base station starts timing from a preset detection time point, and responsive to that a timing duration for which the timing lasts reaches a preset duration, the base station sends a control command through the second frequency domain resource.

The preset detection time point is a predetermined detection time point configured by the base station and the terminal, and is used for definition of an initial time point at which the terminal detects the control command. In general, after a certain frequency domain resource is occupied by the base station, the base station may send the control command through the frequency domain resource at the preset detection time point, and the terminal may detect, at the preset detection time point, the control command sent by the base station through the frequency domain resource.

In a possible implementation, the preset detection time point is determined by the base station and sent to the terminal through higher layer signaling, physical layer signaling or other signaling.

Since the base station occupies the second frequency domain resource after the occupancy of the first frequency domain resource fails, thus at the preset detection time point, the base station sends the control command through the second frequency domain resource rather than the first frequency domain resource. When the terminal detects, at the preset detection time point, the control command sent through the first frequency domain resource, the control command sent by the base station cannot be detected by the terminal, and thus the detection fails. Then, the terminal may switch from the first frequency domain resource to the second frequency domain resource. However, a certain duration needs to be taken to perform the switching, in other words, the terminal starts to detect the control command after a certain duration from the preset detection time point, thus the detection is lagged. Therefore, the terminal may not detect complete command data, and a loss of the command data is resulted.

In order to ensure that the terminal is able to detect complete command data in the control command, the base station may send the control command after the terminal finishes the switching between frequency domain resources rather than immediately send the control command at the preset detection time point.

Therefore, the base station starts timing at the preset detection time point, meanwhile, the terminal starts to switch from the first frequency domain resource to the second frequency domain resource. With passage of time, a timing duration for which the timing lasts gradually increases until it reaches a preset duration, then the switching from the first frequency domain resource to the second frequency domain resource by the terminal is deemed to be accomplished. At this time, the base station sends the control command through the second frequency domain resource, and the terminal may detect the control command sent by the base station through the second frequency domain resource to obtain complete command data in the control command.

It is considered by the base station that the control command is not detected by the terminal at the preset detection time point, and the terminal detects the control command after switching from the first frequency domain resource to the second frequency domain resource. Thus, the time point at which the control command is sent is correspondingly postponed, so that the time point at which the base station starts to send the control command is coincident with the time point at which the terminal starts to detect the control command. In this way, the terminal is able to obtain complete command data in the control command and a loss of the command data is therefore avoided.

Herein, the preset duration is a predefined time length, the preset duration may be identical to the duration used by the terminal for switching from the first frequency domain resource to the second frequency domain resource, or may be larger than the duration used by the terminal for switching from the first frequency domain resource to the second frequency domain resource, so as to enable the terminal to perform detection in time after switching between the frequency domain resources, and to obtain the complete command data. The preset duration may be one symbol, three symbols or one sub-frame or the like. The preset duration may be set according to the duration used by a general terminal for switching between the frequency domain resources.

In a possible implementation, capability of switching between frequency domain resources of the terminal is determined by the terminal, and capability of switching between the frequency domain resources is sent to the base station, herein the capability of switching between the frequency domain resources is used for determining the preset duration. The base station receives the capability of switching between the frequency domain resources from the terminal, and determines, according to the capability of switching between the frequency domain resources, a duration used by the terminal for switching between the frequency domain resources as the preset duration.

At operation 304, responsive to failing to detect, at a preset detection time point, a control command sent by a base station through a first frequency domain resource, the terminal switches from the first frequency domain resource to the second frequency domain resource.

Since the base station occupies the second frequency domain resource after the occupancy of the first frequency domain resource fails, thus the base station sends the control command through the second frequency domain resource rather than the first frequency domain resource at the preset detection time point. When the terminal detects, at the preset detection time point, the control command sent through the first frequency domain resource, the control command sent by the base station cannot be detected by the terminal, and thus the detection fails. Then, the terminal may switch from the first frequency domain resource to the second frequency domain resource.

At operation 305, the terminal detects the control command sent by the base station through the second frequency domain resource.

The preset duration is required by the terminal for switching from the first frequency domain resource to the second frequency domain resource, in other words, the terminal starts to detect the control command after the preset duration from the preset detection time point. Therefore, the terminal is not able to detect the command data from the base station within the preset duration after the preset detection time point.

Accordingly, in order to ensure that the terminal detects the complete command data in the control command, the base station needs to postpone the time point at which the control command is started to be sent by the preset duration. Furthermore, when the terminal detects the control command after switching between frequency domain resources, the time point at which the terminal detects the control command is coincident with the time point at which the base station sends the control command.

Figure 4:
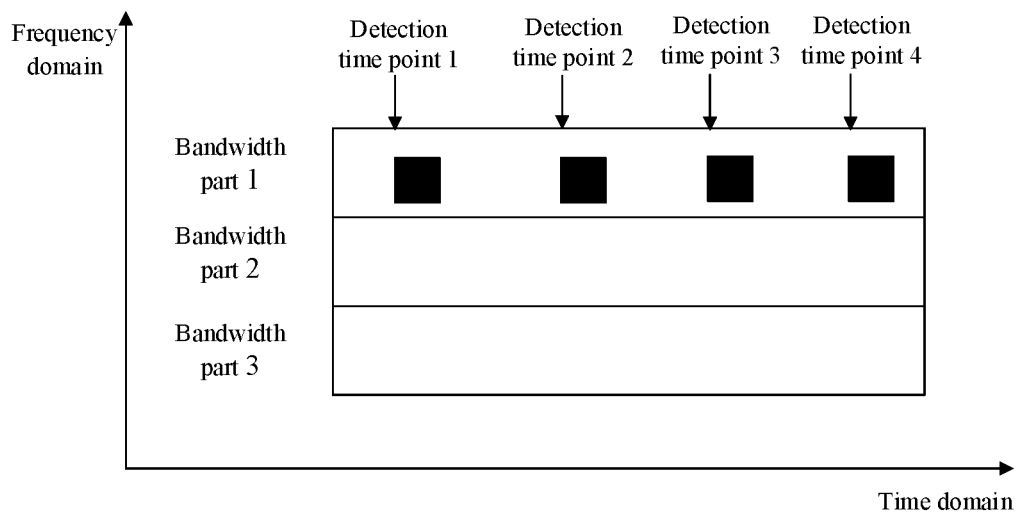
FIG. 4 is a schematic diagram illustrating a plurality of bandwidth parts according to an exemplary embodiment.
Figure 5:
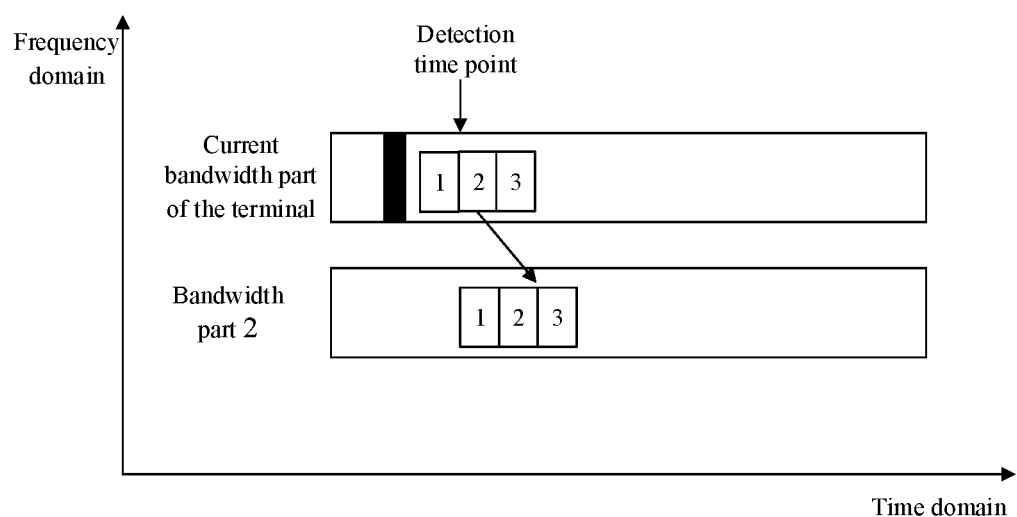
FIG. 5 is a schematic diagram illustrating transmission of command data according to an exemplary embodiment.

FIG. 4 is a schematic diagram illustrating a plurality of bandwidth parts according to an exemplary embodiment. Referring to FIG. 4, the base station configures three bandwidth parts for the terminal, and each bandwidth part is configured with a preset detection time point. FIG. 5 is a schematic diagram illustrating transmission of command data according to an exemplary embodiment. Referring to FIG. 5, the base station configures two bandwidth parts for the terminal. It is assumed that the command data included in the control command includes three symbols: command data 1, command data 2 and command data 3, and the preset duration is one symbol. Originally, the base station would occupy the bandwidth 1, and sequentially send the command data 1, command data 2 and command data 3 through the bandwidth 1 at the preset detection time point. However, when the occupancy of the bandwidth 1 by the base station fails, the base station switches to the bandwidth 2. After one symbol from the preset detection time point, the base station sequentially sends the command data 1, command data 2 and command data 3 through the bandwidth 2. After detection through the first frequency domain resource at the preset detection time point fails, the terminal switches to the second frequency domain resource, and detects the command data 1, command data 2 and command data 3 in the control command.

According to the method in an embodiment of the disclosure, the base station configures different unlicensed frequency domain resources for the terminal, and after an occupancy of a first frequency domain resource fails by the base station, the base station occupies a second frequency domain resource and starts timing from a preset detection time point, and responsive to that a timing duration for which the timing lasts reaches a preset duration, the base station sends a control command through the second frequency domain resource. Therefore, it is ensured that that the base station sends a control command by occupying another unlicensed frequency domain resource when the occupancy of a certain frequency domain resource fails, and it is possible to avoid the problem that the base station cannot send a control command due to the failure of occupying an unlicensed frequency domain resource.

Moreover, the preset duration required by the terminal to switch between frequency domain resources is considered, the time point at which the control command is started to be sent is postponed by the preset duration. Therefore, it is ensured that when the terminal detects the control command after switching between the frequency domain resources, the time point at which the control command is detected is coincident with the time point at which the base station sends the control command, such that the terminal detects complete command data and a loss of the command data is avoided.

Figure 6:
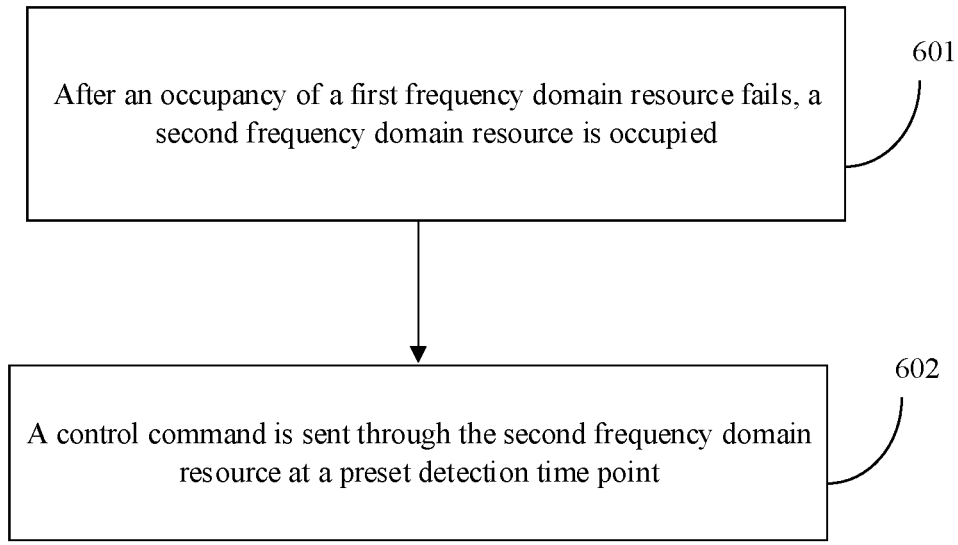
FIG. 6 is a flowchart of a method for transmitting a control command according to an exemplary embodiment.

FIG. 6 is a flowchart of a method for transmitting a control command according to an exemplary embodiment, applied to a base station. As illustrated in FIG. 6, the method includes the following operations.

At operation 601, after an occupancy of a first frequency domain resource fails, a second frequency domain resource is occupied, herein the first frequency domain resource and the second frequency domain resource are different unlicensed frequency domain resources.

At operation 602, a control command is sent through the second frequency domain resource at a preset detection time point.

The control command includes first command data and second command data, and the second command data is identical to command data of the first command data that is transmitted within a preset duration starting from the preset detection time point.

According to the method in an embodiment of the disclosure, the base station configures different unlicensed frequency domain resources for the terminal, if an occupancy of a first frequency domain resource fails by the base station, the base station occupies a second frequency domain resource and sends a control command through the second frequency domain resource at a preset detection time point, the control command includes first command data and second command data. Therefore, it is ensured that that the base station sends the control command by occupying another unlicensed frequency domain resource when the occupancy of a certain frequency domain resource fails, and it is possible to avoid the problem that the base station cannot send a control command due to the failure of occupying an unlicensed frequency domain resource.

Moreover, taking into consideration the fact that the terminal will take the preset duration to switch between frequency domain resources, and the terminal can detect only the third command data in the first command data but cannot detect the second command data transmitted before the third command data, thus the second command data is repeatedly transmitted. In this way, it is ensured that the terminal is able to detect the third command data and the second command data and arrange the second command data in front of the third command data, such that the complete first command data is obtained and a loss of the command data is avoided.

In a possible implementation, the method further includes the following operations.

Capability of switching between frequency domain resources is received from a terminal.

A duration used by the terminal for switching between the frequency domain resources is determined as the preset duration according to the capability of switching between the frequency domain resources.

In a possible implementation, the preset duration is a duration used by the terminal for switching from the first frequency domain resource to the second frequency domain resource.

Figure 7:
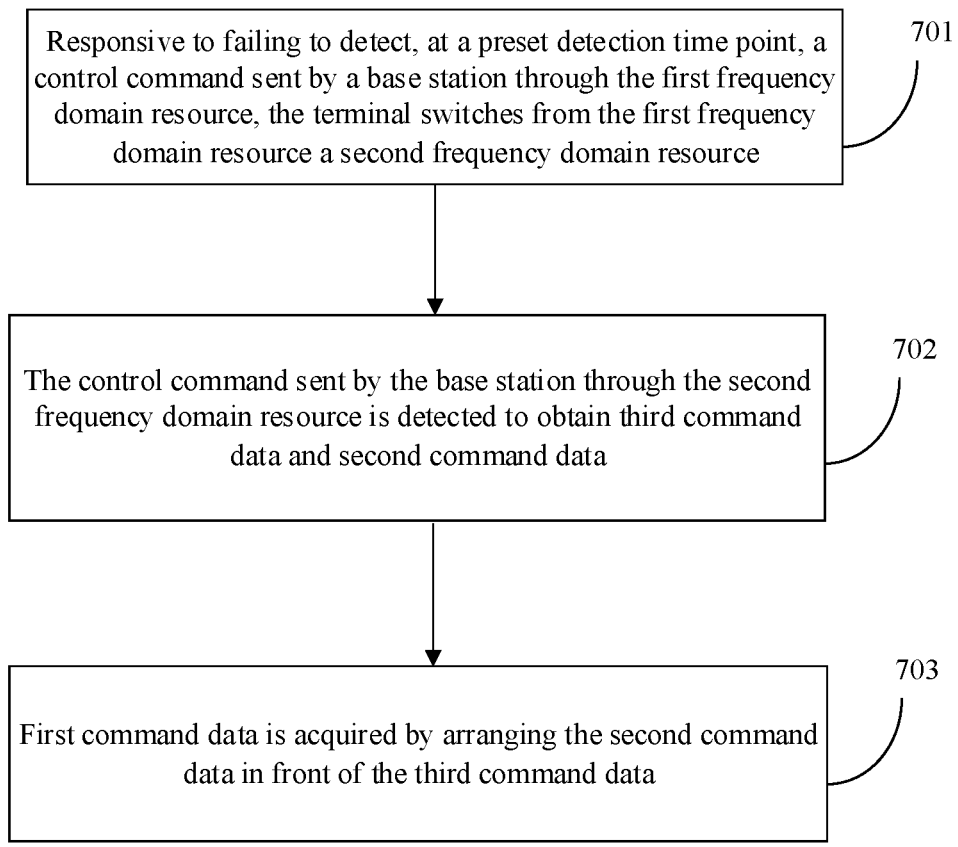
FIG. 7 is a flowchart of a method for transmitting a control command according to an exemplary embodiment.

FIG. 7 is a flowchart of a method for transmitting a control command according to an exemplary embodiment, applied to a terminal. As illustrated in FIG. 7, the method includes the following operations.

At operation 701, responsive to failing to detect, at a preset detection time point, a control command sent by a base station through a first frequency domain resource, the terminal switches from the first frequency domain resource to a second frequency domain resource, herein the first frequency domain resource and the second frequency domain resource are different unlicensed frequency domain resources.

At operation 702, the control command sent by the base station through the second frequency domain resource is detected to obtain third command data and second command data.

The second command data is identical to command data of the first command data that is transmitted within a preset duration starting from the preset detection time point, and the third command data is identical to command data of the first command data that is transmitted after the preset duration starting from the preset detection time point.

At operation 703, first command data is acquired by arranging the second command data in front of the third command data.

According to the method in an embodiment of the disclosure, responsive to failing to detect, at a preset detection time point, a control command sent by the base station through a first frequency domain resource, the terminal switches from the first frequency domain resource to a second frequency domain resource. Furthermore, the terminal detects the control command sent by the base station through the second frequency domain resource to obtain third command data and second command data. Moreover, the base station takes into consideration the fact that the terminal will take the preset duration to switch between frequency domain resources, and the terminal can detect only the third command data in the first command data but cannot detect the second command data transmitted before the third command data, thus the second command data is repeatedly transmitted. Correspondingly, the terminal arranges the second command data repeatedly transmitted by the base station in front of the third command data, such that the complete first command data is obtained and a loss of the command data is avoided.

In a possible implementation, the method further includes that:

capability of switching between the frequency domain resources of the terminal is determined and sent to the base station, herein the capability of switching between the frequency domain resources is used for determining the preset duration.

In a possible implementation, the preset duration is a duration used by the terminal for switching from the first frequency domain resource to the second frequency domain resource.

Figure 8:
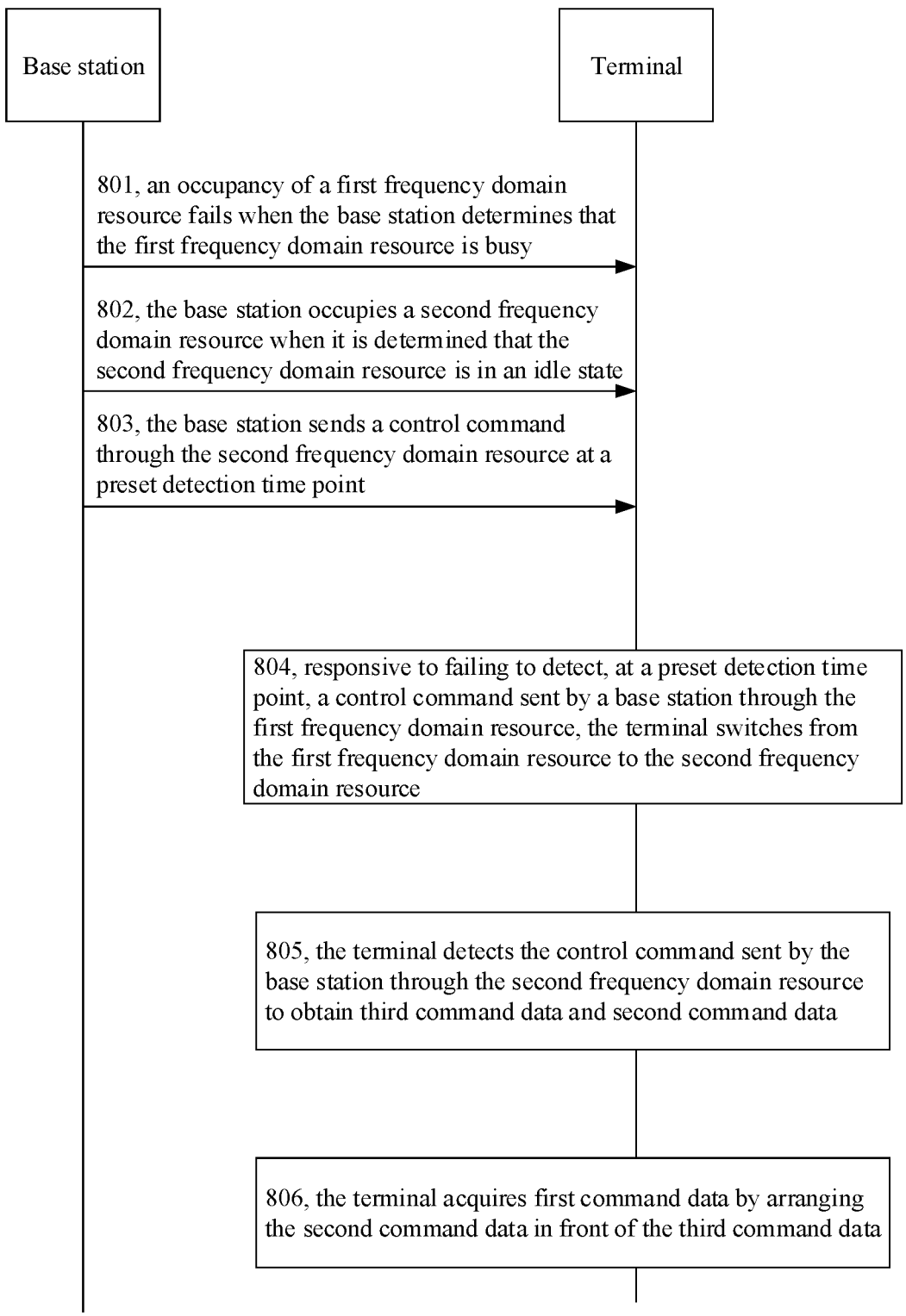
FIG. 8 is a flowchart of a method for transmitting a control command according to an exemplary embodiment.

FIG. 8 is a flowchart of a method for transmitting a control command according to an exemplary embodiment. The interaction subjects are the base station and the terminal in the embodiment illustrated in FIG. 1. As illustrated in FIG. 8, the method includes the following operations.

At operation 801, an occupancy of a first frequency domain resource fails when the base station determines that the first frequency domain resource is busy.

At operation 802, the base station occupies a second frequency domain resource when it is determined that the second frequency domain resource is in an idle state.

Operations 801-802 are similar to the operations 301-302 and will not be elaborated herein.

At operation 803, the base station sends a control command through the second frequency domain resource at a preset detection time point.

Since the base station occupies the second frequency domain resource after the occupancy of the first frequency domain resource fails, thus the base station sends the control command through the second frequency domain resource rather than the first frequency domain resource. When the terminal detects, at the preset detection time point, the control command sent through the first frequency domain resource, the control command sent by the base station cannot be detected by the terminal, and thus the detection fails. Then, the terminal may switch from the first frequency domain resource to the second frequency domain resource. However, a certain duration needs to be taken to perform the switching, in other words, the terminal starts to detect the control command after a certain duration from the preset detection time point. Therefore, the terminal may not detect the command data sent by the base station within the preset duration after the preset detection time point.

Accordingly, in order to ensure that the terminal detects complete first command data in the control command, the control command sent to the terminal includes not only the first command data, but also the second command data, and the second command data is identical to command data of the first command data that is transmitted within a preset duration starting from the preset detection time point, and the second command data which is not detected during the process of switching between frequency domain resources by the terminal is thus transmitted repeatedly.

Herein, the preset duration is a predefined time length, the preset duration may be identical to the duration used by the terminal for switching from the first frequency domain resource to the second frequency domain resource, or may be larger than the duration used by the terminal for switching from the first frequency domain resource to the second frequency domain resource, so as to enable the terminal to perform detection in time after switching between the frequency domain resources, and to obtain the complete command data. The preset duration may be one symbol, three symbols or one sub-frame or the like. The preset duration may be set according to the duration used by a general terminal for switching between the frequency domain resources.

In a possible implementation, the base station and the terminal may negotiate in advance to determine the preset duration. For example, the base station may send the preset duration to the terminal through higher layer signaling, MAC CE signaling, and physical layer signaling or other signaling; or, the preset duration may be preset in a transmission protocol instead of being sent by the base station through signaling.

In a possible implementation, the terminal determines capability of switching between frequency domain resources of the terminal, and sends the capability of switching between the frequency domain resources to the base station. The base station receives the capability of switching between the frequency domain resources from the terminal and determines the duration used for switching between the frequency domain resources by the terminal as the preset duration according to the capability of switching between the frequency domain resources.

At operation 804, responsive to failing to detect, at the preset detection time point, a control command by the base station through the first frequency domain resource, the terminal switches from the first frequency domain resource to the second frequency domain resource.

Operation 804 is similar to the operation 304 and will not be elaborated herein.

At operation 805, the terminal detects the control command sent by the base station through the second frequency domain resource to obtain third command data and second command data.

Since the control command includes first command data and second command data, and the terminal switches from the first frequency domain resource to the second frequency domain resource after the preset detection time point and thus it would take a preset duration. Therefore, when detecting the control command sent by the base station through the second frequency domain resource, the terminal detects the third command data and then the second command data. The third command data is identical to command data of the first command data that is transmitted after a preset duration starting from the preset detection time point.

Figure 9:
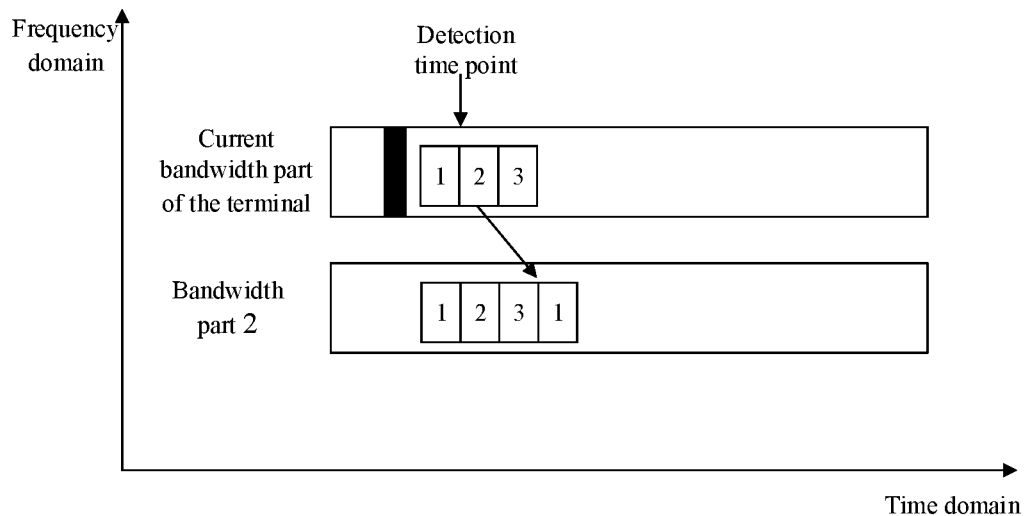
FIG. 9 is a schematic diagram illustrating transmission of command data according to an exemplary embodiment.

FIG. 9 is a schematic diagram illustrating transmission of command data according to an exemplary embodiment. Referring to FIG. 9, the base station configures two bandwidth parts for the terminal, it is assumed that the command data included in the control command includes three symbols: command data 1, command data 2 and command data 3, and the preset duration is one symbol. Originally, the base station would occupy the bandwidth 1, and sequentially send the command data 1, command data 2 and command data 3 through the bandwidth 1 at the preset detection time point. However, when the occupancy of the bandwidth 1 by the base station fails, the base station switches to the bandwidth 2, then at the preset detection time point, the base station sequentially sends the command data 1, command data 2 and command data 3 through the bandwidth 2, and resents the command data 1 after sending the command data 3.

At operation 806, the terminal acquires first command data by arranging the second command data in front of the third command data.

In order to avoid losing the second command data, the base station repeatedly sends the second command data after the first command data. However, in the original control command, the second command data is located before the third command data, the command data therefore needs to be rearranged when the terminal detects the second command data after detecting the third command data. Specifically, the second command data is arranged in front of the third command data, and the arranged command data is complete first command data in the control command.

On the basis of the above example illustrated in FIG. 9, when the terminal detects the control command after switching to the second frequency domain resource, the terminal sequentially detects the command data 2, command data 3 and command data 1, and rearranges the detected command data, that is, arrange the command data 1 in front of the command data 2 and command data 3, to obtain the arranged command data.

It is to be noted that the base station and the terminal may predefine a processing rule which defines that: after switching between the frequency domain resources by the base station, the base station repeatedly sends, after sending the control command, the command data of the control command that is transmitted within the original preset duration; and after switching between the frequency domain resources, the terminal arranges the command data which is sent by the base station later in front of the command data which is sent first, to obtain the arranged command data. The base station and the terminal perform transmission and detection of the control command based on the processing rule.

According to the method provided in the embodiment of the disclosure, the base station configures different unlicensed frequency domain resources for the terminal, and after an occupancy of a first frequency domain resource fails, the base station occupies a second frequency domain resource and sends a control command through the second frequency domain resource at a preset detection time point, the control command includes first command data and second command data. Therefore, it is ensured that that the base station sends the control command by occupying another unlicensed frequency domain resource when the occupancy of a certain frequency domain resource fails, and it is possible to avoid the problem that the base station cannot send the control command due to the failure of occupying the unlicensed frequency domain resource is avoided. Moreover, taking into consideration the fact that the terminal will take the preset duration to switch between frequency domain resources, and the terminal can detect only the third command data in the first command data but cannot detect the second command data transmitted before the third command data, thus the second command data is repeatedly transmitted. In this way, it is ensured that the terminal is able to detect the third command data and the second command data and arrange the second command data in front of the third command data, such that the complete first command data is obtained and a loss of the command data is avoided.

Figure 10:
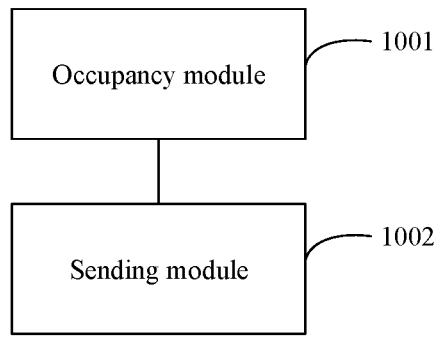
FIG. 10 is a block diagram illustrating a base station according to an exemplary embodiment.

FIG. 10 is a block diagram illustrating a base station according to an exemplary embodiment. Referring to FIG. 10, the base station includes an obtaining module 1001 and a sending module 1002.

The occupancy module 1001 is configured to: after an occupancy of a first frequency domain resource fails, occupy a second frequency domain resource, the first frequency domain resource and the second frequency domain resource are different unlicensed frequency domain resources.

The sending module 1002 is configured to start timing from a preset detection time point, and responsive to that a timing duration for which the timing lasts reaches a preset duration, send the control command through the second frequency domain resource.

In a possible implementation, the base station further includes a receiving module and a determination module.

The receiving module is configured to receive capability of switching between frequency domain resources from a terminal.

The determination module is configured to determine, according to the capability of switching between the frequency domain resources, a duration used by the terminal for switching between the frequency domain resources as the preset duration.

In a possible implementation, the preset duration is a duration used by the terminal for switching from the first frequency domain resource to the second frequency domain resource.

Figure 11:
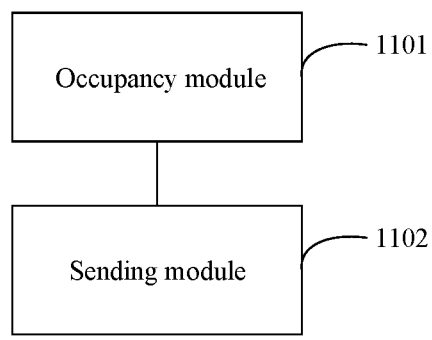
FIG. 11 is a block diagram illustrating a base station according to an exemplary embodiment.

FIG. 11 is a block diagram illustrating a base station according to an exemplary embodiment. Referring to FIG. 11, the base station includes an obtaining module 1101 and a sending module 1102.

The occupancy module 1101 is configured to: after an occupancy of a first frequency domain resource fails, occupy a second frequency domain resource, the first frequency domain resource and the second frequency domain resource are different unlicensed frequency domain resources.

The sending module 1102 is configured to send the control command through the second frequency domain resource at a preset detection time point.

The control command includes first command data and second command data, and the second command data is identical to command data of the first command data that is transmitted within a preset duration starting from the preset detection time point.

In a possible implementation, the base station further includes a receiving module and a determination module.

The receiving module is configured to receive capability of switching between frequency domain resources from a terminal.

The determination module is configured to determine, according to the capability of switching between the frequency domain resources, a duration used by the terminal for switching between the frequency domain resources as the preset duration.

In a possible implementation, the preset duration is a duration used by the terminal for switching from the first frequency domain resource to the second frequency domain resource.

Figure 12:
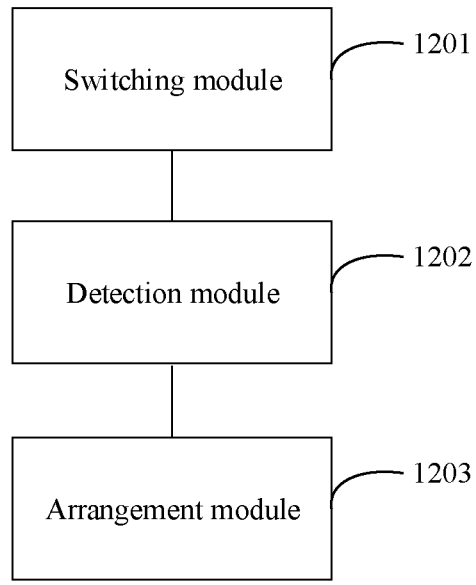
FIG. 12 is a block diagram illustrating a terminal according to an exemplary embodiment.

FIG. 12 is a block diagram illustrating a terminal according to an exemplary embodiment. Referring to FIG. 12, the terminal includes a switching module 1201, a detection module 1202 and an arrangement module 1203.

The switching module 1201 is configured to: responsive to failing to detect, at a preset detection time point, a control command sent by a base station through a first frequency domain resource, switch from the first frequency domain resource to a second frequency domain resource, the first frequency domain resource and the second frequency domain resource are different unlicensed frequency domain resources.

The detection module 1202 is configured to detect a control command sent by the base station through the second frequency domain resource to obtain third command data and second command data.

The second command data is identical to command data of the first command data that is transmitted within a preset duration starting from the preset detection time point, and the third command data is identical to command data of the first command data that is transmitted after the preset duration starting from the preset detection time point.

The arrangement module is configured to acquire first command data by arranging the second command data in front of the third command data.

In a possible implementation, the terminal further includes a determination module and a sending module.

The determination module is configured to determine capability of switching between frequency domain resources of the terminal.

The sending module is configured to send the capability of switching between the frequency domain resources to the base station, the capability of switching between the frequency domain resources is used for determining the preset duration.

In a possible implementation, the preset duration is a duration used by the terminal for switching from the first frequency domain resource to the second frequency domain resource.

It is to be noted that the above functional modules are only described for exemplary purposes for the detection of a control command by the base station and the terminal provided in the foregoing embodiments. In actual applications, the above functions may be allocated to different functional modules according to needs, which means that the internal structure of the terminal and the base station is divided into different functional modules to complete all or some of the above described functions. Moreover, the embodiments of the base station and the embodiments of the terminal provided by the foregoing embodiments is based on the same concept as the embodiment of the method for detecting the control command. For the specific implementation process, refer to the method embodiments, and the details are not described herein again.

Figure 13:
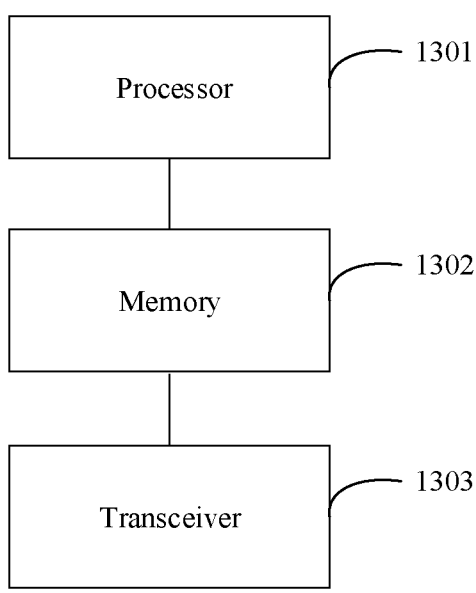
FIG. 13 is a block diagram illustrating a base station according to an exemplary embodiment.

FIG. 13 is a block diagram illustrating a base station according to an exemplary embodiment. Referring to FIG. 13, the base station includes a processor 1301, a memory 1302 configured to store instructions executable by the processor and a transceiver 1303. The processor 1301 is configured to execute the following instructions.

After an occupancy of a first frequency domain resource fails, a second frequency domain resource is occupied, the first frequency domain resource and the second frequency domain resource are different unlicensed frequency domain resources.

Timing is started from a preset detection time point, and responsive to that a timing duration for which the timing lasts reaches a preset duration, the control command is sent through the second frequency domain resource.

A computer-readable storage medium is provided, the instructions in the computer-readable storage medium may cause the base station to perform the operations performed by the base station in the method for detecting a control command in the foregoing embodiments when the instructions are executed by the processor of the base station.

Figure 14:
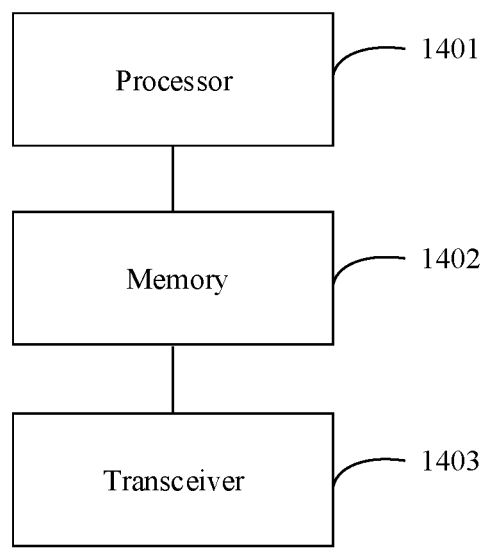
FIG. 14 is a block diagram illustrating a base station according to an exemplary embodiment.

FIG. 14 is a block diagram illustrating a base station according to an exemplary embodiment. Referring to FIG. 14, the base station includes a processor 1401, a memory 1402 configured to store instructions executable by the processor and a transceiver 1403. The processor 1401 is configured to execute the following instructions.

After an occupancy of a first frequency domain resource fails, a second frequency domain resource is occupied, the first frequency domain resource and the second frequency domain resource are different unlicensed frequency domain resources.

The control command is sent through the second frequency domain resource at a preset detection time point.

The control command includes first command data and second command data, and the second command data is identical to command data of the first command data that is transmitted within a preset duration starting from the preset detection time point.

A computer-readable storage medium is provided, the instructions in the computer-readable storage medium may cause the base station to perform the operations performed by the base station in the method for detecting a control command in the foregoing embodiments when the instructions are executed by the processor of the base station.

Figure 15:
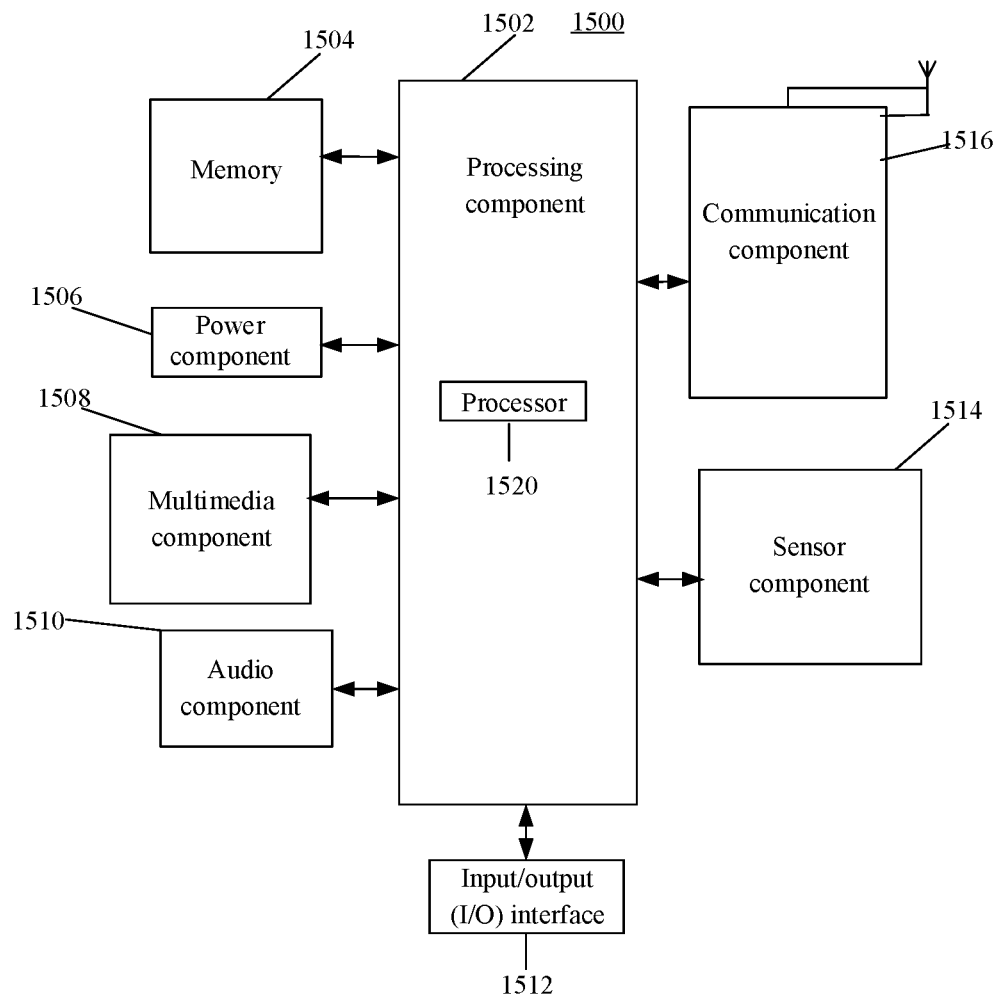
FIG. 15 is a block diagram illustrating a terminal according to an exemplary embodiment.

FIG. 15 is a block diagram illustrating a terminal 1500 according to an exemplary embodiment. Referring to FIG. 15, the terminal 1500 may be a mobile telephone, a computer, a digital broadcast device, a messaging device, a gaming console, a tablet, a medical device, exercise equipment, a personal digital assistant, or the like.

Referring to FIG. 15, the terminal 1500 may include one or more of a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the terminal 1500, such as the operations associated with display, telephone calls, data communications, camera operations, and recording operations. The processing component 1502 may include one or more processors 1520 to execute instructions to implement all or part of the steps in the above described methods. Moreover, the processing component 1502 may include one or more modules which facilitate the interaction between the processing component 1502 and other components. For example, the processing component 1502 may include a multimedia module to facilitate the interaction between the multimedia component 1508 and the processing component 1502.

The memory 1504 is configured to store various types of data to support the operation of the terminal 1500. Examples of such data include instructions for any applications or methods operated on the terminal 1500, contact data, phonebook data, messages, pictures, video, etc. The memory 1504 may be implemented using any type of volatile or non-volatile memory devices, or a combination thereof, such as, a Static Random Access Memory (SRAM), an Electrically-Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk The power component 1506 provides power to various components of the terminal 1500. The power component 1506 may include a power management system, one or more power sources, and any other components associated with the generation, management, and distribution of power in the terminal 1500.

The multimedia component 1508 includes a screen providing an output interface between the terminal 1500 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes, and gestures on the TP. The touch sensors may not only sense a boundary of a touch or swipe operation, but also sense a period of time during which the touch or swipe action is performed, and a pressure associated with the touch or swipe action. In some embodiments, the multimedia component 1508 includes a front camera and/or a rear camera. The front camera and/or the rear camera may receive external multimedia data while the terminal 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone (MIC) configured to receive an external audio signal when the terminal 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide assessments on status of various aspects of the terminal 1500. For instance, the sensor component 1514 may detect an on/off state of the terminal 1500, relative positioning of components, such as the display and the keypad, of the terminal 1500. The sensor component 1514 may further detect a change in position of the terminal 1500 or a change in position of a component of the terminal 1500, a presence or absence of user contact with the terminal 1500, an orientation or an acceleration/deceleration of the terminal 1500, and a change in temperature of the terminal 1500. The sensor component 1514 may include a proximity sensor configured to detect the presence of nearby objects without any physical contact. The sensor component 1514 may also include a light sensor, such as a Complementary Metal-Oxide-Semiconductor (CMOS) or Charge-Coupled Device (CCD) image sensor, for use in imaging applications. In some embodiments, the sensor component 1514 may also include an acceleration sensor, a gyroscope sensor, a magnetic sensor, a pressure sensor, or a temperature sensor.

The communication component 1516 is configured to facilitate wired or wireless communication between the terminal 1500 and other devices. The terminal 1500 can access a wireless network based on a communications standard, such as WiFi, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a Near Field Communication (NFC) module to facilitate short-range communications.

In exemplary embodiments, the terminal 1500 may be implemented with one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, micro-controllers, microprocessors, or other electronic components, for performing the above described methods for detecting a control command.

In exemplary embodiments, there is also provided a non-transitory computer-readable storage medium including instructions, such as included in the memory 1504, executable by a processor 1520 in the terminal 1500, for performing the above-described methods. For example, the non-transitory computer-readable storage medium may be a ROM, a Compact Disc Read-Only Memory (CD-ROM), a magnetic tape, a floppy disc, an optical data storage device, or the like.

A person skilled in the art can understand that all or part of the steps for carrying out the above embodiments can be completed by a hardware or a program instructing the related hardware. The program can be stored in a computer readable storage medium. The medium mentioned above may be an ROM, a magnetic or optical disk.

What are described above are merely optional embodiments of the disclosure, and are not to limit the disclosure, and any modification, equivalent and improvement within the spirit and principles in the embodiments of the disclosure shall be covered in the protective scope of the embodiments of the disclosure.

What is claimed is:

1. A method for transmitting a control command, applied to a base station, comprising:
   after an occupancy of a first frequency domain resource fails, occupying a second frequency domain resource, wherein the first frequency domain resource and the second frequency domain resource are different unlicensed frequency domain resources; and
   starting timing from a preset detection time point, and responsive to that a timing duration for which the timing lasts reaches a preset duration, sending the control command through the second frequency domain resource to a terminal, the control command comprising first command data and second command data,
   wherein the second command data is identical to command data of the first command data that is transmitted within a preset duration starting from the preset detection time point, and
   command data of the first command data that is transmitted after the preset duration starting from the preset detection time point is third command data, and the first command data is acquired by arranging the second command data in front of the third command data.

2. The method of claim 1, further comprising:
   receiving capability of switching between frequency domain resources from the terminal; and
   determining, according to the capability of switching between the frequency domain resources, a duration used by the terminal for switching between the frequency domain resources as the preset duration.

3. The method of claim 1, wherein the preset duration is a duration used by the terminal for switching from the first frequency domain resource to the second frequency domain resource.

4. A method for transmitting a control command, applied to a terminal, comprising:
   responsive to failing to detect, at a preset detection time point, a control command sent by a base station through a first frequency domain resource, switching from the first frequency domain resource to a second frequency domain resource, wherein the first frequency domain resource and the second frequency domain resource are different unlicensed frequency domain resources;
   detecting a control command sent by the base station through the second frequency domain resource to obtain third command data and second command data; and
   acquiring first command data by arranging the second command data in front of the third command data,
   wherein the second command data is identical to command data of the first command data that is transmitted within a preset duration starting from the preset detection time point, and the third command data is identical to command data of the first command data that is transmitted after the preset duration starting from the preset detection time point.

5. The method of claim 4, further comprising:
   determining capability of switching between frequency domain resources of the terminal; and
   sending the capability of switching between the frequency domain resources to the base station, wherein the capability of switching between the frequency domain resources is used for determining the preset duration.

6. The method of claim 4, wherein the preset duration is a duration used by the terminal for switching from the first frequency domain resource to the second frequency domain resource.

7. The base station implementing the method of claim 1, comprising:
   a processor;
   a transceiver; and
   memory, configured to store instructions executable by the processor,
   wherein the processor is configured to perform steps of the method, and the processor is configured to perform the sending of the control command through the transceiver.

8. The base station of claim 7, wherein the processor is further configured to:
   receive capability of switching between frequency domain resources from a terminal; and
   determine, according to the capability of switching between the frequency domain resources, a duration used by the terminal for switching between the frequency domain resources as the preset duration.

9. The base station of claim 7, wherein the preset duration is a duration used by the terminal for switching from the first frequency domain resource to the second frequency domain resource.

10. The terminal implementing the method of claim 4, comprising:
    a processor; and
    memory, configured to store instructions executable by the processor, wherein the processor is configured to perform steps of the method.

11. The terminal of claim 10, wherein the processor is further configured to:
    determine capability of switching between frequency domain resources of the terminal; and
    send the capability of switching between the frequency domain resources to the base station, wherein the capability of switching between the frequency domain resources is used for determining the preset duration.

12. The terminal of claim 10, wherein the preset duration is a duration used by the terminal for switching from the first frequency domain resource to the second frequency domain resource.

* * * * *